(12) United States Patent
Rodriguez et al.

(10) Patent No.: US 10,970,933 B2
(45) Date of Patent: Apr. 6, 2021

(54) DEVICE, SYSTEM AND METHOD FOR EMBEDDING ONE OR MORE ATTRIBUTES IN A GRAPHICAL OBJECT

(71) Applicant: Vidit, LLC, Layton, UT (US)

(72) Inventors: Rene Rodriguez, Layton, UT (US); George Michael Theodore, Greensboro, NC (US); Rodrigo Moya, Layton, UT (US)

( * ) Notice: Subject to any disclaimer, the term of this patent is extended or adjusted under 35 U.S.C. 154(b) by 0 days.

(21) Appl. No.: 16/037,868

(22) Filed: Jul. 17, 2018

(65) Prior Publication Data

US 2020/0074731 A1   Mar. 5, 2020

(51) Int. Cl.
| G09G 5/00 | (2006.01) |
| G06T 19/00 | (2011.01) |
| G06F 3/0484 | (2013.01) |
| G06F 3/0482 | (2013.01) |
| G06F 3/01 | (2006.01) |

(52) U.S. Cl.
CPC ............ *G06T 19/006* (2013.01); *G06F 3/011* (2013.01); *G06F 3/0482* (2013.01); *G06F 3/04842* (2013.01)

(58) Field of Classification Search
CPC ....... G06T 19/006; G06T 19/00; G06F 3/011; G06F 3/012; G02B 27/017

USPC .......................................................... 345/633
See application file for complete search history.

(56) References Cited

U.S. PATENT DOCUMENTS

| 2011/0110568 A1* | 5/2011 | Vesper .................. G06F 19/321 |
| | | 382/128 |
| 2013/0298178 A1* | 11/2013 | Perlman ............. H04N 21/2381 |
| | | 725/116 |
| 2015/0318018 A1* | 11/2015 | Kaiser .................... G11B 27/00 |
| | | 386/241 |

* cited by examiner

*Primary Examiner* — Gordon G Liu
(74) *Attorney, Agent, or Firm* — Michael F. Krieger; Kirton McConkie (57) ABSTRACT

A system for embedding or attaching to one or more attributes to a graphical object may is disclosed. The system includes a user device configured to obtain a graphical object. The graphical object includes at least one of an image or a geolocation. The system also includes a server communicatively coupled to the user device. The server includes a marker subsystem configured to create at least one marker on the graphical object. The server also includes an embedding subsystem configured to embed one or more attributes in the graphical object. The one or more attributes includes a video, an augmented reality video, a 3-dimensional content, a hyperlink or a text. The server further includes a queue manager configured to process and upload the embedded graphical object. The server further includes an alert subsystem configured to generate a notification upon uploading of the embedded graphical object.

7 Claims, 6 Drawing Sheets

FIG. 6

DEVICE, SYSTEM AND METHOD FOR EMBEDDING ONE OR MORE ATTRIBUTES IN A GRAPHICAL OBJECT

BACKGROUND

Graphical objects have been attached to communications such as e-mail. These communication methods have also allowed the embedding of graphical objects within the communication itself. Searching for the graphical object is problematic, however, as the context, such as the sender or the text of the associated communication must often be remembered.

SUMMARY

Embodiments of the present invention relate to image data processing and more particularly to, a system and method for embedding one or more attributes with a graphical object in an http request.

A Vidit is a digital construct drawing from several sources. The backbone of a Vidit is a Vidit application on a smartphone which makes a request to a Vidit server using, but not limited to one of the following protocols: http, ftp, https. Attached to the request is a JPEG file, a user identification number, a creation date and a location. The user identification number is used to access user information from a user database once the Vidit request has been received by a server. Information such as name, birth date, gender, preferences, phone number and other information is stored in the User Identification database, updated, and augmented when needed. The GPS location of the user when the Vidit was created is provided by the cellular telephone or other communication device sending the Vidit. Vidits may also have other information included such as video recordings, links to other sites, etc. The user identification number is used to locate the Vidit through a search. Limitations to access may be placed on each Vidit individually during creation, or through user preferences in the user identification database associated with the user identification number when received by a server. Access limitations include viewing by the creator of the Vidit only, only a group may view, only viewers in a specific geographical area may view, or other limitations based on the attributes of the Vidit. A Vidit may also not have access limitations and everyone may view it. A Vidit may also be located through a search of location, date of creation, or any of the other attributes of the Vidit such as subject matter.

When the Vidit app request is received by a server, the server processes the Vidit request packet by processing the JPEG or digital image and any attached video into a binary format and coding the video into different versions for viewing by Android, IOS or other formats. Settings, preferences, and attributes are applied from the user ID database. The video is also re-sized and a thumbnail is created for previewing. The processed packet may be combined with the GPS location sent by the cellular telephone and associated with the user identification number. The server may now search a database for this processed, completed Vidit packet by user identification number, the image itself, date of creation, or any of the other attributes of the packet and access may be limited by preferences from the user information in the user identification database or from limitations placed on the Vidit in an application on the cellular phone of the creator before the Vidit is sent to the server for processing. Links to other sites may also be included in the Vidit packet. Also included in the packet may be an augmented reality function, 3-dimensional content, audio/video or text. The server is configured to generate a notification upon uploading of the Vidit packet.

In accordance with another embodiment of the present disclosure, a method for embedding the one or more attributes with an http, ftp, https or other protocol request is provided. The method includes obtaining a graphical object. The graphical object includes at least an image, but may also include a JPEG file with a video file and a geolocation. The method also includes creating at least one marker on the graphical object. The marker is used for a map view of nearby Vidit locations. The method further includes embedding one or more attributes with the graphical object. The one or more attributes includes a video, an augmented reality video, a 3-dimensional content, a hyperlink or a text. The method further includes processing and uploading graphical object. The method includes generating a notification upon uploading of the embedded graphical object.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE PREFERRED EMBODIMENTS

For the purpose of promoting an understanding of the elements of the invention, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present invention.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to attaching one or more attributes to a graphical object. The system includes a user device configured to obtain a graphical object. The graphical object may be a JPEG file or video recording or both. A cellular telephone may attach a GPS location. The system also includes a server communicatively coupled to the user device. The server includes a user identification number and a marker subsystem configured to create at least one marker with the graphical object. The server also includes an attachment subsystem in some embodiments operatively coupled to the marker system and configured to attach one or more attributes to the graphical object. The one or more attributes may include a video, an augmented reality video, augmented reality overlays for objects scan at a geolocation, 3-dimensional content, a hyperlink or a text. The server further includes a queue manager operatively coupled to the embedding subsystem and configured to process and upload the embedded graphical object. The server may also search for the processed Vidit packet using any of several criteria including the date of creation, the user identification number, the content, or the GPS location. The server further includes an alert subsystem operatively coupled with the queue manager and configured to generate a notification upon uploading of the embedded graphical object.

Figure 1:
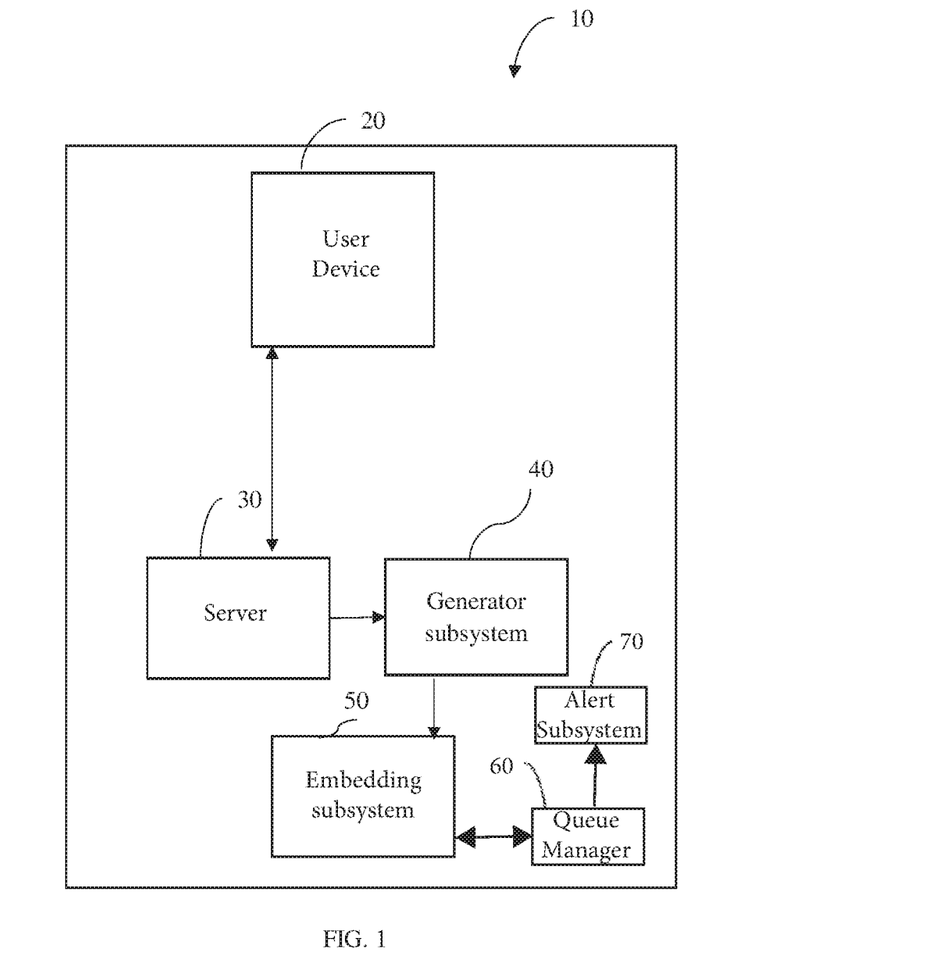
FIG. 1 is a block diagram of a system for attaching one or more attributes with a graphical object in accordance with an embodiment of the present invention.

FIG. 1 is a block diagram of a system 10 for embedding one or more attributes in a graphical object in accordance with an embodiment of the present disclosure. The system 10 includes a user device 20 configured to obtain a graphical object. The system 10 also includes a server 30 communicatively coupled to the user device 20. In one embodiment, the server 30 may include a cloud computing platform. The server 30 receives a request from the app on user device 20. The request has attached a location, a graphic and includes a user identification number which can be accessed by the server through subsystem 40 configured to create at least one attribute on the graphical object and a geolocation marker. As used herein, the term "marker" is defined as a location on a map. The server 30 further includes an embedding subsystem 50, in some embodiments operatively coupled to the marker system 40. The embedding or attachment subsystem 50 is configured to embed one or more attributes in the Vidit packet. The one or more attributes includes a video, an augmented reality video, 3-dimensional content, a hyperlink or a text or other attributes. In one embodiment, three or more attributes may be embedded in the graphical object together. In yet another embodiment, four or more attributes may be embedded in the Vidit package packet together.

Furthermore, the system 10 includes a queue manager 60 operatively coupled to the embedding subsystem 50. The queue manager 60 is configured to process and upload the embedded graphical object in the Vidit packet as well as any other attachments within the packet. The system 10 further includes an alert subsystem 70 operatively coupled to the queue manager 60. The alert subsystem 70 is configured to generate a notification upon uploading of the embedded graphical object.

In one embodiment, the system 10 includes an interface (not shown in FIG. 1) which is configured to enable creation of or access to an already created user profile. As used herein, the term "user profile" is defined as personal data associated with a user. In some embodiments, the system 10 may include a permission subsystem (not shown in FIG. 1) configured to receive a user input representative of a viewing permission and embed the viewing permission with the graphical object. In such an embodiment, the user input representative of the viewing permission may include a private permission representative of a permission to one or more specific people to view the graphical object and a public permission representative of a permission to any person to view the graphical object.

In one embodiment, the system 10 may be configured to tag one or more users in the embedded graphical object. As used herein, the term "tag" is defined as a label attached to someone or something for a purpose of identification or to give information. In a specific embodiment, the system 10 may be configured to add active links or one or more hyperlinks to the embedded graphical object. As used herein, the term "active link" is defined as an active text or a graphic link on a Web page. Clicking the link redirects the user to another web page or a document or an image.

Figure 2:
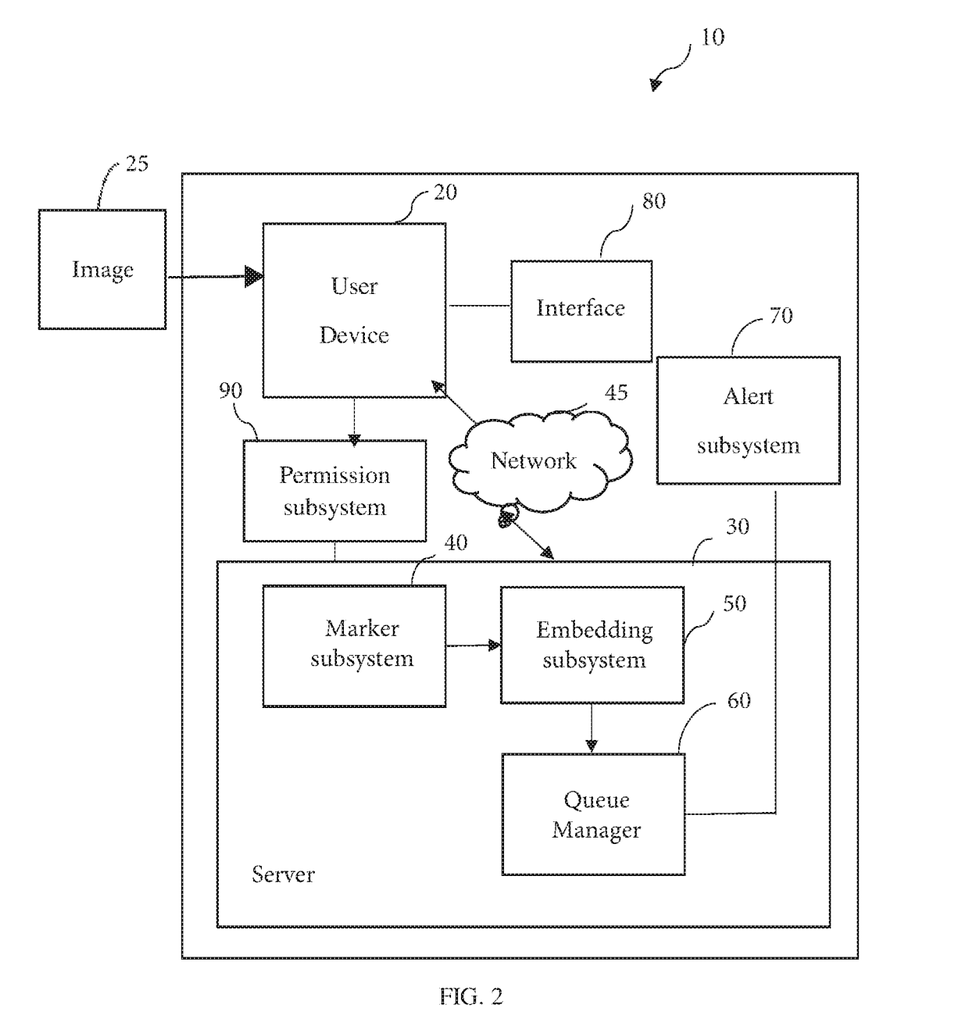
FIG. 2 is a block diagram of an exemplary system to attach one or more attributes in an image of FIG. 1 in accordance with an embodiment of the present invention.

FIG. 2 is a block diagram of an exemplary system 10 for embedding one or more attributes with an image 25 in accordance with an embodiment of the present invention. The system 10 includes a user device 20 which is configured to obtain the image 25. The system 10 also includes a server 30 coupled to the user device 20 via a communication network 45. The server 30 includes a marker subsystem 40 which is configured to create at least one marker with the image. The server 30 further includes an embedding subsystem 50 which is configured to embed the one or more attributes to the image 25. The one or more attributes include a video, an augmented reality video, augmented reality transparent overlays 3-dimensional content, a hyperlink a text, or other add-ons.

In one embodiment, to embed the video in the image, the embedding subsystem 50 is configured to receive image information and video information. In one embodiment, the image information may include a size information and a dimension information of the image 25. In another embodiment, the video information may include a size of video, a duration of video and a dimension information. The embedding subsystem 50 is further configured to set the image based on the video information. The embedding subsystem 50 is further configured to identify a place of interest in the image 25. The embedding subsystem 50 is further configured to embed the video on the place of interest in the image 25.

In some embodiments, to embed the augmented reality video in the image 25, the embedding subsystem 50 is configured to receive the image of a real environment. In such embodiment, the image may include a two-dimensional image. The embedding subsystem 50 is further configured to identify a position in the image. The embedding subsystem 50 is further configured to segment the position in the image and identify at least one segment of the real environment in distinction to a remaining part of the real environment. The embedding subsystem 50 is further configured to merge the augmented reality video with the image of the real environment by removing at least one part of the segment of the real environment from the image of the real environment. The embedding subsystem 50 is further configured to embed the augmented reality video in at least one removed part of the segment of the image.

In a specific embodiment, to embed the hyperlink in the image 25, the embedding subsystem 50 is configured to receive and optimize the image. the embedding subsystem 50 further configured to obtain a hyperlink path of the image. The embedding subsystem 50 is further configured to obtain a hyperlink path of a landing page. As used herein, the term "landing page" is defined as a web page which serves as the entry point for a website or a particular section of a website. The embedding subsystem 50 is further configured to create a hypertext markup language snippet based on the hyperlink path of the image and the hyperlink path of the landing page. The embedding subsystem 50 is further configured to embed the hypertext markup language snippet in the image.

In another embodiment, to embed the text in the image 25, the embedding subsystem 50 is configured to convert at least a part of the text to a bit stream. The embedding subsystem 50 is further configured to convert at least a part of image to a one-dimensional data. The embedding subsystem 50 is further configured to embedding the bit stream into the one-dimensional data. The embedding subsystem 50 is further configured to restore the one-dimensional data embedded with the text to image data.

Furthermore, the server 30 includes a queue manager 60 operatively coupled to the embedding subsystem 50. The queue manager 60 is configured to process and upload an embedded image 25. The server 30 further includes an alert subsystem 70 operatively coupled to the queue manager 60. The alert subsystem 70 is configured to generate a notification upon uploading of the embedded image on the server 30. In a specific embodiment, the server 30 may include a cloud-based computing platform In one embodiment, the system 10 includes an interface 80 which is configured to enable creation of a user profile. In such embodiment, the embedding subsystem 50 process and upload the image 25 in the user profile. In some embodiments, the system 10 may include a permission subsystem 90 configured to receive a user input representative of a viewing permission and embed the viewing permission in the image 25. In such embodiment, the user input representative of the viewing permission may include a private permission representative of a permission to one or more specific people to view the image 25 and a public permission representative of a permission to any person to view the image 25. In a specific embodiment, the permission subsystem 90 may apply the viewing permission on the user profile.

In one embodiment, the system 10 may be configured to tag one or more users in the embedded image. In a specific embodiment, the system 10 may be configured to add active links or one or more hyperlinks in the embedded image. Clicking the link redirects the user to another web page or a document or an image.

Figure 3:
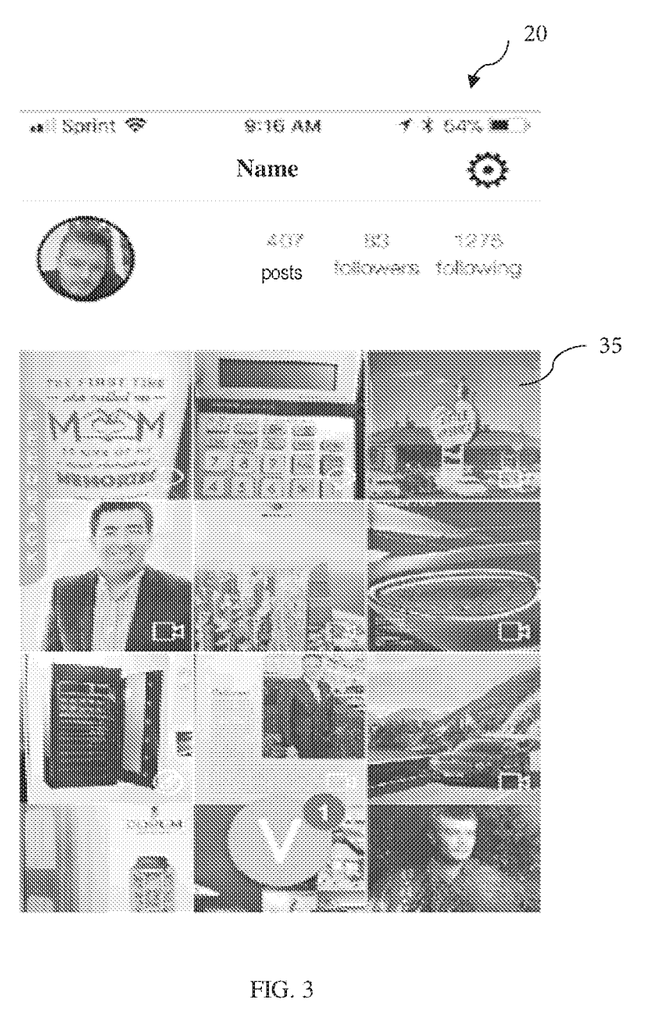
FIG. 3 is a series of screen shots from an exemplary system to attach one or more attributes to a geolocation of FIG. 1 in accordance with an embodiment of the present invention.

FIG. 3 is a block diagram of an exemplary system 10 to embed one or more attributes in a geolocation 35 in accordance with an embodiment of the present disclosure. The system 10 includes a user device 20 which is configured to obtain the geolocation 35. The system 10 also includes a server 30 coupled to the user device 20 via a communication network 45. The server 30 includes a marker subsystem 40 which is configured to create at least one marker on the geolocation 35. The server 30 further includes an embedding subsystem 50 which is configured to embed the one or more attributes in the geolocation 35. The one or more attributes includes a video, an augmented reality video, an augmented reality transparent overlay 3-dimensional content, a hyperlink, a text, or other add-ons.

In one embodiment, to embed the one or more attributes in the geolocation 35, the embedding subsystem 50 is configured to receive the one or more attributes relating to a point of interest. The embedding subsystem 50 is further configured to determine a location relating to the point of interest. The embedding subsystem 50 is further configured to map the location to determine the geolocation for the location. The embedding subsystem 50 is further configured to co-relate the geolocation 35 with the one or more attributes.

Furthermore, the server 30 includes a queue manager 60 operatively coupled to the embedding subsystem 50. The queue manager 60 is configured to process and upload an embedded geolocation. The server 30 further includes an alert subsystem 70 operatively coupled to the queue manager 60. The alert subsystem 70 is configured to generate a notification upon uploading of the embedded geolocation on the server 30.

In one embodiment, the system 10 includes an interface 80 which is configured to enable creation of a user profile. Data regarding an individual is stored and accessed by a user identification number. In some embodiments, the system 10 may include a permission subsystem 90 configured to receive a user input representative of a viewing permission and embed the viewing permission in the geolocation 35. In such embodiment, the user input representative of the viewing permission may include a private permission representative of a permission to one or more specific people to view the geolocation 35 and a public permission representative of a permission to any person to view the geolocation 35. In a specific embodiment, the permission subsystem 90 may apply the viewing permission on the user profile.

In one embodiment, the system 10 may be configured to tag one or more users in the embedded geolocation. In a specific embodiment, the system 10 may be configured to add active links or one or more hyperlinks in the embedded geolocation. Clicking the link redirects the user to another web page or a document or an image.

Figure 4:
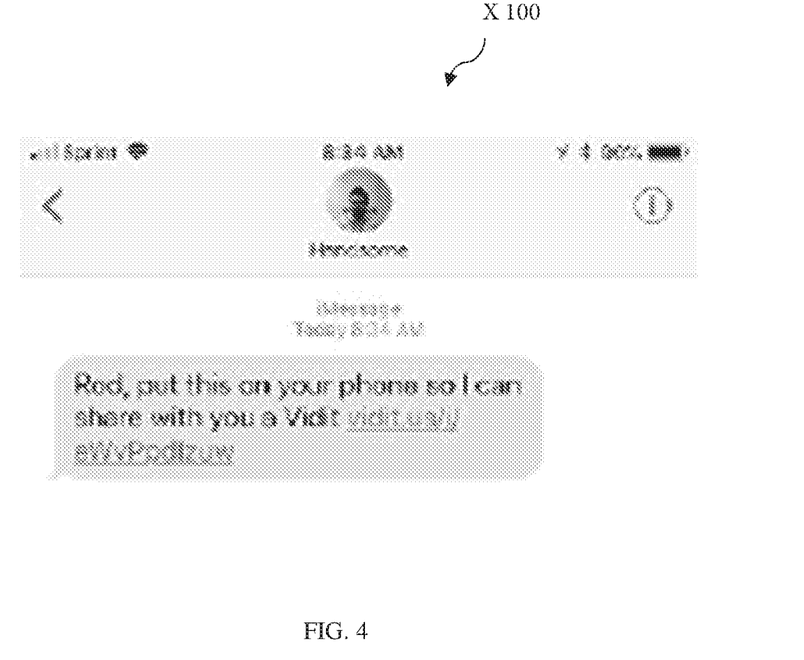
FIG. 4 is a block diagram of an exemplary system for attaching the one or more attributes to the graphical object of FIG. 1 in accordance with an embodiment of the present invention.

FIG. 4 is a block diagram of an exemplary the system 10 for embedding the one or more attributes in the graphical object of FIG. 1 in accordance with an embodiment of the present disclosure. To create one or more interactive graphical objects such as an image or a geolocation, a user X 100 provides an input using a user device 20. The input is a graphical object. The graphical object is at least one of an image or a location. The user X 100 then creates a user profile in the system 10 using an interface 80. In the user profile, the user X 100 may provide the input such as an image or a geolocation.

In operation, the user input is then transmitted to a server 30 coupled to the user device 20 via a communication network. In one embodiment, the communication network may include wired communication network such as LAN. In another embodiment, the communication network may include a wireless communication network such as 2G, 3G, 4G, LTE, HSDPA, WiFi, Bluetooth, Zigbee, Low Power WAN or the like. The server 30 includes a marker subsystem 40 which creates at least one marker on the graphical object. The server 30 also includes an embedding subsystem 50 which is configured to embed one or more attributes in the graphical object. The one or more attributes includes a video, an augmented reality video, a 3-dimensional content, a hyperlink or a text. The image or the location embedded with the one or more attributes is then processed and uploaded on the server 30 such as cloud-based server 30 using the queue manager 60.

Upon uploading, the alert subsystem 70 generates a notification of successful upload. In such uploaded image or geolocation, the user X 100 may tag one or more persons. Tagging is performed to optimally describe the image or location. In addition, the user X 100 may apply viewing permissions to the graphical object using the permission subsystem 90. In one embodiment, the permission subsystem 90 may also apply the viewing permission on the user profile. In such embodiment, the user input representative of the viewing permission includes a private permission representative of a permission to one or more specific people to view the graphical object and a public permission representative of a permission to any person to view the graphical object. The user X 100 may select the viewing audience as public or private for control over the images and content.

Figure 5:
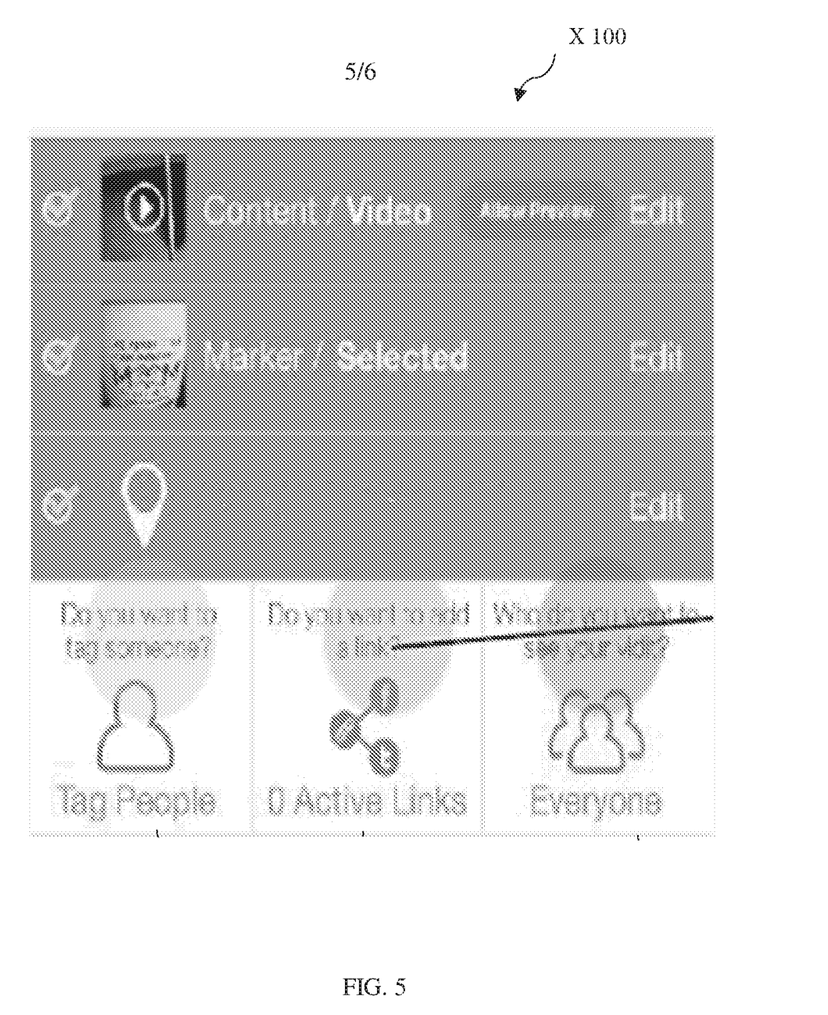
FIG. 5 illustrates different permission levels for access to view an image.
Figure 6:
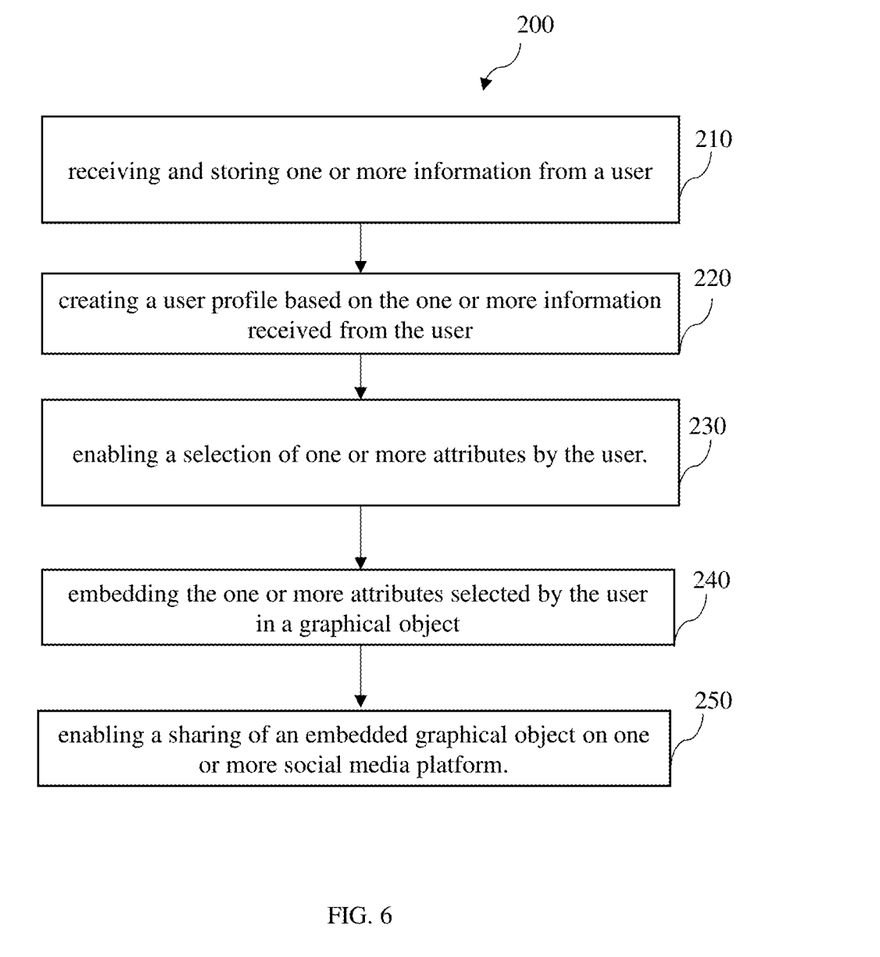
FIG. 6 illustrates a flow chart representing the steps involved in a method for embedding the one or more attributes in the graphical object of FIG. 1 in accordance with an embodiment of the present invention.

FIG. 5 illustrates a flow chart representing the steps involved in a method 200 for embedding the one or more attributes in the graphical object of FIG. 1 in accordance with an embodiment of the present disclosure. The method 200 includes obtaining a graphical object, where the graphical object includes at least one of an image or a geolocation in step 210. The method 200 also includes creating at least one marker on the graphical object in step 220. The method 200 further includes embedding one or more attributes in the graphical object, where the one or more attributes includes a video, an augmented reality video, a 3-dimensional content, a hyperlink or a text in step 230.

The method 200 further includes processing and uploading an embedded graphical object in step 240. In one embodiment, processing and uploading the embedded graphical object may include processing and uploading the embedded graphical object in a user profile. The method 200 further includes generating a notification upon uploading of the embedded graphical object in step 250.

In some embodiments, the method 200 may include tagging one or more users in the embedded graphical object. In one embodiment, the method 200 may include adding one or more active links or one or more hyperlinks in the embedded graphical object. In a specific embodiment, the method 200 may include enabling creation of a user profile. In one embodiment, the method 200 may include applying viewing permissions to the graphical object. In such embodiment, applying the viewing permissions to the graphical object may include applying a private permission representative of a permission to one or more specific people to view the graphical object and a public permission representative of a permission to any person to view the graphical object.

Various embodiments of the present disclosure enable interactive sharing of information as compared to conventional methods as the user may embed one or more attributes in the graphical object.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method 200 in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system comprising:
   a user device configured to obtain a graphical object and place it in a data packet;
   a server communicatively coupled to an application program on the user device, wherein the server comprises:
   a data packet processor that processes an image from an application program image and an attached video into a binary format and codes any video into different versions for viewing by Android, IOS or other formats;
   a marker subsystem configured to create at least one marker on the graphical object;
   a user ID database containing settings, preferences and attributes which are applied to the data packet;
   a video re-sizer and thumbnail creator;
   an embedding subsystem operatively coupled to the marker system and configured to embed one or more attributes in the graphical object, wherein the one or more attributes comprises a video, an augmented reality video, a 3-dimensional content, a geolocation, a hyperlink or a text;
   a queue manager operatively coupled to the embedding subsystem and configured to process and upload the graphical object and the embedded attributes, wherein processing and uploading the embedded graphical object comprises processing and uploading the embedded graphical object in a user profile;
   a permission subsystem configured to impose a viewing permission in the embedding subsystem and embed the viewing permission in the graphical object; and
   an alert subsystem configured to generate a notification to the application program, upon uploading of the embedded graphical object.

2. The system of claim 1, wherein the viewing permission comprises a private permission representative of a permission to one or more specific people to view the image and a public permission representative of a permission to any person to view the image.

3. A method comprising:
obtaining a graphical object, wherein the graphical object comprises at least one of an image or a geolocation;
creating a marker at the location of the capture of the image in the graphical object;
embedding one or more attributes in the graphical object, wherein the one or more attributes comprises a video, an augmented reality video, a 3-dimensional content, a hyperlink or a text;
processing and uploading an embedded graphical object, wherein processing and uploading the embedded graphical object comprises processing and uploading the embedded graphical object in a user profile;
applying viewing permissions to the graphical object, wherein the viewing permission is embedded in the graphical object; and
generating a notification upon uploading of the embedded graphical object.

4. The method of claim 3, further comprising tagging one or more users in the embedded graphical object.

5. The method of claim 3, further comprising adding one or more active links or one or more hyperlinks in the embedded graphical object.

6. The method of claim 3, further comprising enabling creation of a user profile.

7. The method of claim 3, wherein applying the viewing permissions to the graphical object comprises applying a private permission representative of a permission to one or more specific people to view the graphical object and a public permission representative of a permission to any person to view the graphical object.

* * * * *